US008555331B2

(12) United States Patent (10) Patent No.: US 8,555,331 B2
Limbasia (45) Date of Patent: Oct. 8, 2013

(54) METHOD AND SYSTEM OF PROVISIONING A FEATURE FOR MULTIPLE MEDIA DEVICES

(75) Inventor: Sunil D. Limbasia, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 978 days.

(21) Appl. No.: 12/347,461

(22) Filed: Dec. 31, 2008

(65) Prior Publication Data

US 2010/0169912 A1 Jul. 1, 2010

(51) Int. Cl.
*H04N 7/173* (2011.01)
*H04N 7/18* (2006.01)

(52) U.S. Cl.
USPC ............................. 725/142; 725/25; 725/140

(58) Field of Classification Search
USPC ..................... 725/1, 132, 140, 139, 142, 25
See application file for complete search history.

(56) References Cited

U.S. PATENT DOCUMENTS

| | | | | |
|---|---|---|---|---|
| 7,113,765 | B2* | 9/2006 | Minear et al. | 455/405 |
| 7,555,464 | B2* | 6/2009 | Candelore | 705/59 |
| 7,844,263 | B2* | 11/2010 | Marsh et al. | 455/418 |
| 2004/0261093 | A1* | 12/2004 | Rebaud et al. | 725/25 |
| 2005/0028208 | A1* | 2/2005 | Ellis et al. | 725/58 |
| 2006/0117354 | A1* | 6/2006 | Schutte et al. | 725/78 |
| 2008/0231684 | A1* | 9/2008 | Underwood et al. | 348/14.01 |
| 2009/0180621 | A1* | 7/2009 | Kratz et al. | 380/278 |
| 2009/0260042 | A1* | 10/2009 | Chiang | 725/80 |
| 2009/0327398 | A1* | 12/2009 | Campbell et al. | 709/202 |
| 2010/0071020 | A1* | 3/2010 | Addington et al. | 725/132 |
| 2010/0186034 | A1* | 7/2010 | Walker | 725/40 |
| 2011/0191771 | A1* | 8/2011 | Balassanian | 717/178 |

FOREIGN PATENT DOCUMENTS

EP 1069746 A1 * 1/2001

* cited by examiner

*Primary Examiner* — Pankaj Kumar
*Assistant Examiner* — Reuben M Brown (57) ABSTRACT

An approach is provided for the self-provisioning of a feature corresponding to multiple media devices (e.g., set-top boxes). A request to provision a feature on a plurality of set-top boxes is received. It is determined whether the feature is compatible with each of the set-top boxes. The feature is automatically provisioned based on the request and the determination.

20 Claims, 10 Drawing Sheets

METHOD AND SYSTEM OF PROVISIONING A FEATURE FOR MULTIPLE MEDIA DEVICES

BACKGROUND INFORMATION

Today, media devices, such as set-top boxes (STB), are quickly becoming the central hub for accessing entertainment and communication services. Many consumers are finding that these devices enable ubiquitous access to a wide variety of media content (e.g., broadcast television programs, on-demand programming, pay-per-view programming, and even Internet-based content). As a consequence, consumers often have multiple media devices in their households. Moreover, it is recognized that advances in technology, services, and affordability are accelerating explosive growth in the features these devices offer. At the same time, consumers are becoming accustomed to instant delivery of features and services through on demand services (e.g., video on demand). This expectation of instant delivery, however, can be problematic as traditional telecommunications and communications provisioning processes are slow. In particular, these features can involve complex manual provisioning processes and take a significant amount of time to complete. These delays, along with the inconvenience accompanying such manual processes, can discourage users from subscribing to these features.

Therefore, there is a need for an approach that automatically and rapidly provisions device features.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred apparatus, method, and system for provisioning a feature on multiple media devices are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Although various exemplary embodiments are described with respect to a set-top box (STB), it is contemplated that these embodiments have applicability to any device capable of processing audio-video (AV) signals for presentation to a user, such as a home communication terminal (HCT), a digital home communication terminal (DHCT), a stand-alone personal video recorder (PVR), a television set, a digital video disc (DVD) player, a video-enabled phone, an AV-enabled personal digital assistant (PDA), and/or a personal computer (PC), as well as other like technologies and customer premises equipment (CPE).

Figure 1:
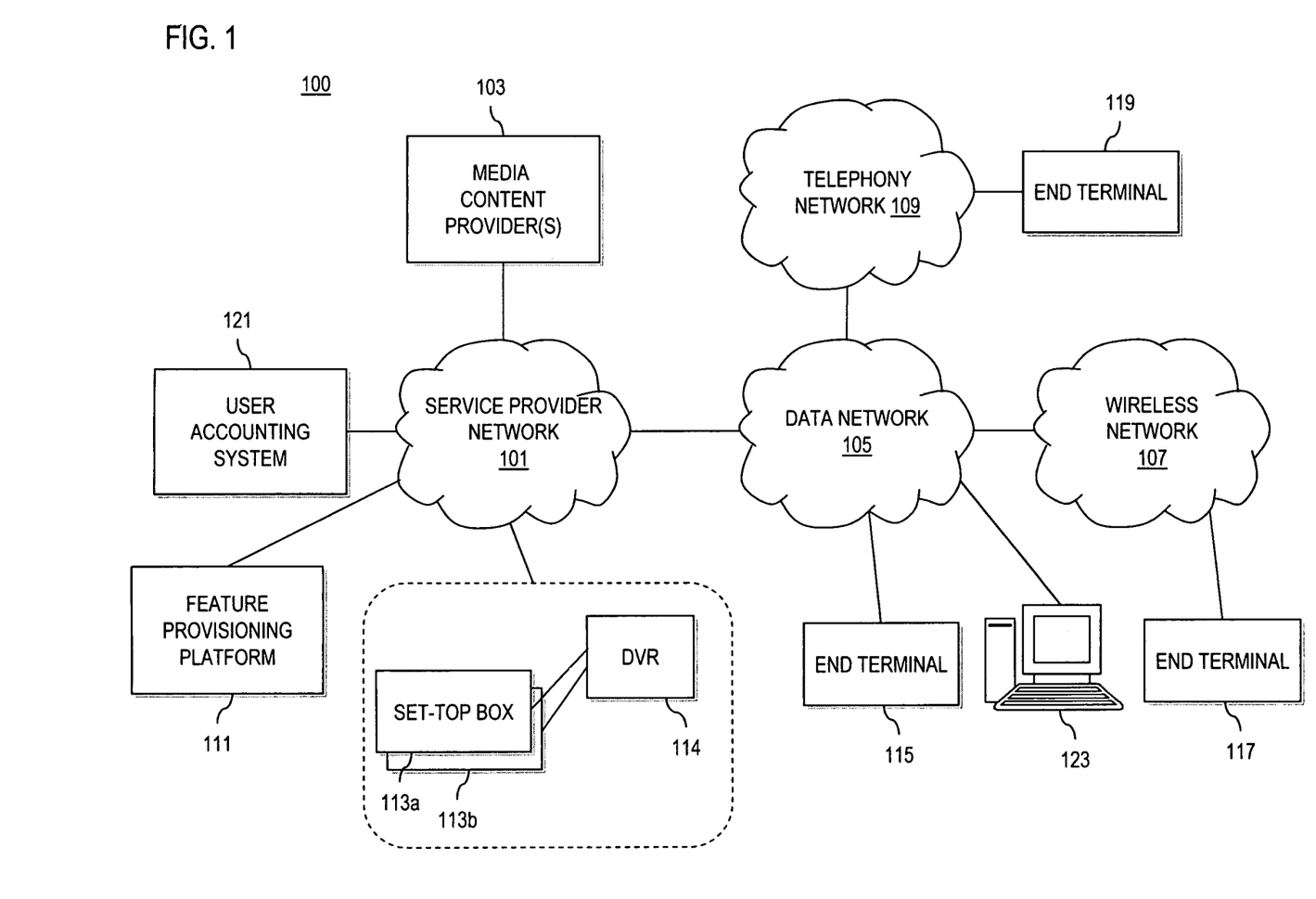
FIG. 1 is a diagram of a system capable of provisioning a feature on multiple media devices, according to an exemplary embodiment.

FIG. 1 is a diagram of a system capable of provisioning a feature on multiple media devices, according to an exemplary embodiment. For the purposes of illustration, a system 100 for provisioning a feature on multiple media devices is described with respect to a service provider network 101 including one or more media content providers 103. It is contemplated that system 100 may embody many forms and include multiple and/or alternative components and facilities. As used herein, the term media content is contemplated broadly to include a wide range of media. For example, media content can include any audio-video content (e.g., broadcast television programs, digital video recorder (DVR) content, on-demand programs, pay-per-view programs, IPTV (Internet Protocol Television) feeds, DVD related content, etc.), pre-recorded media content, data communication services content (e.g., commercials, advertisements, videos, movies, etc.), Internet-based content (e.g., streamed video), and/or any other equivalent media form.

In addition, system 100 includes a data network 105, a wireless network 107, and a telephony network 109. It is contemplated that the data network 105 may be any local area network (LAN), metropolitan area network (MAN), wide area network (WAN), the Internet, or any other suitable packet-switched network, such as a commercially owned, proprietary packet-switched network, e.g., a proprietary cable or fiber-optic network. In addition, the wireless network 107 may be, for example, a cellular network and may employ various technologies including code division multiple access (CDMA), enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, wireless fidelity (WiFi), satellite, and the like. These networks 105-109, in conjunction with service provider network 101, can support various media sessions (e.g., television broadcasts, on-demand videos, etc.) and devices (e.g., STBs, computing devices, mobile devices, etc.).

A feature provisioning platform 111 introduces the capability to automatically and quickly provision a feature on multiple media devices. As shown in FIG. 1, the platform 111 resides on the network side. In addition (or alternatively), the feature provisioning platform 111 may reside within a customer premises equipment (CPE) (not shown). Specifically, the feature provisioning platform 111 receives a request to provision a feature that can be enabled on multiple devices, e.g., set-top boxes 113. The platform 111 also determines whether the feature is compatible with the devices 113, and provisions the feature appropriately. As part of the provisioning process, the feature provisioning platform 111 may, for example, authenticate the devices and send a command to the devices to activate the feature. In addition, the feature provisioning platform 111 can determine the appropriate price to charge for the feature and update the billing and user account records associated with the devices to reflect the provisioning of the feature. The platform 111 can perform the provisioning process automatically without manual intervention to respond to a feature request.

As discussed above, users have come to expect instant access to a host of features available to media devices, including new features that are implemented across multiple devices (e.g., MR-DVR, home media distribution). However, the provisioning process for features involving multiple devices can be quite labor-intensive and time consuming. The delay between the time a user requests a feature and the time the feature is activated presents a barrier to a user's willingness to procure the feature. Traditionally, multiple customer service representatives and/or technicians may be needed to manually update multiple systems with the service provider's network to enable a feature. For example, a user contacts a customer service representative to request a new feature. The customer service representative logs the request in an ordering system. The ordering system may then notify a technical support representative to provision the user's devices for the new service. Next, the ordering system typically waits for confirmation from the technical support representative that provisioning of the feature has been completed successfully. After the confirmation is received, the ordering system notifies a billing representative to update the appropriate accounting records to charge the user for the new feature before completing the feature activation process. Often times, there can be significant delays between each step as the provisioning task is handed from one representative to another.

The feature provisioning platform 111 addresses this problem by enabling the user to self-provision a feature using a completely automated system that integrates the various systems within the service provider's network. As seen in FIG. 1, the feature provisioning platform 111 has connectivity to multiple devices such as STBs 113a and 113b via service provider network 101. The set-top boxes 113a, 113b may share a common media recording device 114 (e.g., DVR); such capability to share content stemming from the DVR 114 is referred to as a multi-room (MR) DVR feature and can be automatically procured through the platform 111. The platform 111 also has connectivity to end terminal 115 via data network 105, end terminal 117 via wireless network 107, and end terminal 119 via telephony network 109. Any of the devices (i.e., STBs 113a-113b and end terminals 115-119) may provide access to the services and functions of the feature provisioning platform 111.

For example, end terminal 115 may be any computing device (e.g., Personal Digital Assistant (PDA), personal computer, laptop, etc.) or communication device (e.g., a video conferencing terminal, a digital home communication terminal (DHCT) capable of providing access to the services and functions of the feature provisioning platform 111. End terminal 117 may be any media-capable mobile device (e.g., a mobile handset, video-capable cellular telephone, etc.). Furthermore, end terminal 119 may, for instance, include a home communication terminal (HCT) or any other telephonic device capable of accessing the services and functions of the platform 111.

According to one embodiment, the service provider network 101 additionally permits access to a user accounting system 121. System 121 stores information regarding user accounts and profiles including information on available devices, subscribed services, user profiles, etc. In certain embodiments, the feature provisioning platform 111 may access the user accounting system 121 to assist in the automated provisioning process.

Moreover, the system 100 enables a host 123 to access the feature provisioning platform 111 via a graphical user interface (GUI) such as a browser application or any web-based application for STBs 113a-113b and/or end terminals 115-119. Under one scenario, it is contemplated that a user can configure feature provisioning services, functions, and preferences for STBs 113a-113b and/or end terminals 115-119 via a web browser.

STBs 113a-113b and/or end terminals 115-119 can communicate using data network 105, wireless network 107, and/or telephony network 109. These systems can include: a public data network (e.g., the Internet), various intranets, local area networks (LAN), wide area networks (WAN), the public switched telephony network (PSTN), integrated services digital networks (ISDN), other private packet switched networks or telephony networks, as well as any additional equivalent system or combination thereof. These networks may employ various access technologies including cable networks, satellite networks, subscriber television networks, digital subscriber line (DSL) networks, optical fiber networks, hybrid fiber-coax networks, worldwide interoperability for microwave access (WiMAX) networks, Long Term Evolution (LTE) networks, wireless fidelity (WiFi) networks, other wireless networks (e.g., 3G wireless broadband networks, mobile television networks, radio networks, etc.), terrestrial broadcasting networks, provider specific networks (e.g., a Verizon® FiOS network, a TIVO™ network, etc), and the like. Such networks may also utilize any suitable protocol supportive of data communications, e.g., transmission control protocol (TCP), Internet protocol (IP), user datagram protocol (UDP), hypertext markup language (HTML), dynamic HTML (DHTML), file transfer protocol (FTP), telnet, hypertext transfer protocol (HTTP), asynchronous transfer mode (ATM), wireless application protocol (WAP), socket connection (e.g., secure sockets layer (SSL)), Ethernet, frame relay, and the like, to connect STBs 113a-113b and/or end terminals 115-119 to the feature provisioning platform 111 and to media content providers 103.

Although depicted in FIG. 1 as separate networks, data network 105, wireless network 107, and/or telephony network 109 may be completely or partially contained within service provider network 101. For example, service provider network 101 may include facilities to provide for transport of packet-based, wireless, and/or telephony communications. As such, exemplary embodiments of the feature provisioning platform 111 may, for instance, comprise hypertext markup language (HTML) user interfaces or JAVA™ applets accessed via world-wide-web pages. These interfaces are particularly useful in extending system 100 functionality to devices having limited resources (e.g., PDAs, handsets, thin-clients, etc.), as well as providing scalable solutions to varied devices without necessitating intensive high-end costs associated with independent design, tooling, and manufacturing.

In particular embodiments, service provider network 101 can include an IPTV system (not shown) configured to support the transmission of television video programs from television broadcast systems as well as other video content, such as media content from the various media content providers 103 utilizing IP. That is, the IPTV system may deliver signals and/or video content in the form of IP packets. Further, the transmission network (e.g., service provider network 101) may optionally support end-to-end data encryption in conjunction with the delivery of video content.

In this manner, the use of IP permits media content to be integrated with broadband Internet services, and thus, share common connections to a user site. Also, IP packets can be more readily manipulated, and therefore, provide users with greater flexibility in terms of control, as well as offer superior methods for increasing the availability of media content. Delivery of media content, by way of example, may be through a multicast from the IPTV system to the STBs 113a-113b and end terminals 115-119. Any individual STB or end terminal may tune to a particular media source by simply joining a multicast (or unicast) of the video content utilizing an IP group membership protocol (IGMP). For instance, the IGMP v2 protocol may be employed for joining STBs to new multicast (or unicast) groups. Such a manner of delivery avoids the need for expensive tuners to view media content, such as television broadcasts; however, other delivery methods, such as directly modulated carriers (e.g., national television systems committee (NTSC), advanced television systems committee (ATSC), quadrature amplitude modulation (QAM)), may still be utilized. It is noted that conventional delivery methods may also be implemented and combined with the advanced methods of system 100. Further, the media content may be provided to various IP-enabled devices, such as the computing, telephony, and mobile apparatuses previously delineated.

While system 100 is illustrated in FIG. 1, the exemplary components are not intended to be limiting, and indeed, additional or alternative components and/or implementations may be utilized.

In one embodiment, the feature provisioning service is a managed service, whereby a service provider operates the feature provisioning platform 111 to serve one or more subscribers.

Figure 2:
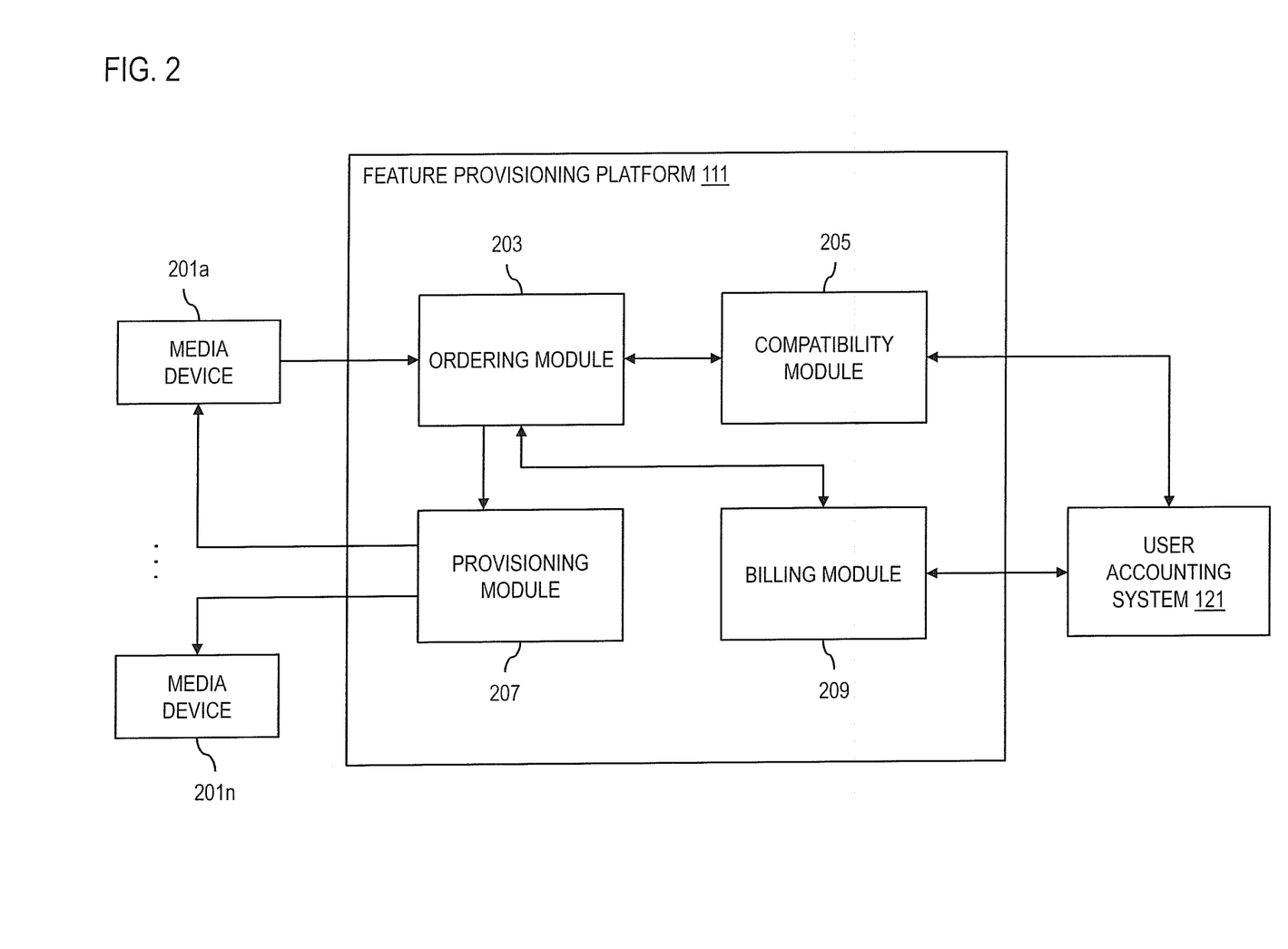
FIG. 2 is a diagram of the components of a feature provisioning platform, according to an exemplary embodiment.

FIG. 2 is a diagram of the components of a feature provisioning platform, according to an exemplary embodiment. By way of example, the feature provisioning platform 111 may include one or more modules to provision a feature for media devices 201 (e.g., STBs 113a and 113b of system 100). Within platform 111, an ordering module 203 interacts with devices 201 to receive a request to provision a feature on devices 201. The ordering module 203 may then coordinate the functions of the compatibility module 205, provisioning module 207, and billing module 209209 to accomplish the request. Compatibility module 205 may, for instance, determine whether a requested feature is compatible with the devices 201 by comparing the feature requirements against the capabilities of the devices 201 as stored in user accounting system 121 (e.g., in form of a user or subscriber profile. For example, in the case of a MR-DVR feature, this feature requires that a user have at least one hub device and one or more client devices. Compatibility module 205 can determine whether the devices 201 meet the device requirements for provisioning the MR-DVR feature and report the determination to the ordering module 203.

Concurrently or sequentially with the compatibility determination, the billing module 209 may be configured to dynamically determine the price of the requested feature based on a number of factors (e.g., account information, marketing campaigns, regional information, etc.). For example, the billing module 209 can be configured to offer discounts based on other features that are already provisioned on the devices. A user with MR-DVR already provisioned on devices 201 may be offered a discounted subscription to a home media manager feature which enables the user to stream media from a hub device (e.g., a STB) to a device other than an STB (e.g., home computer). In another example, the billing module 209 may offer discounts based on the geographical location of devices 201. In exemplary embodiments, the billing module 209 may also be configured to automatically update the billing records and user account information stored in user accounting system 121 to reflect the addition of the requested feature.

After compatibility and billing are confirmed, the provisioning module 207 may signal devices 201 to activate the requested feature. More specifically, the provisioning module 207 may be configured to authenticate the devices 201 and send a command to activate the feature by, for example, updating a flag that corresponds to the feature. In exemplary embodiments, the flag may be configured as a toggle whereby a first update signal switches the feature flag from "off" to "on" and a second update signal switches the flag from "on" to "off." It is contemplated that any logic or circuitry can be implemented to indicate the activation or deactivation of the provisioned feature.

In this way, the feature provisioning platform 111 provides an automated link between devices 201, ordering module 203, compatibility module 205, billing module 209, provisioning module 207, and user accounting system 121 to facilitate self-provisioning requests from users.

Figure 3:
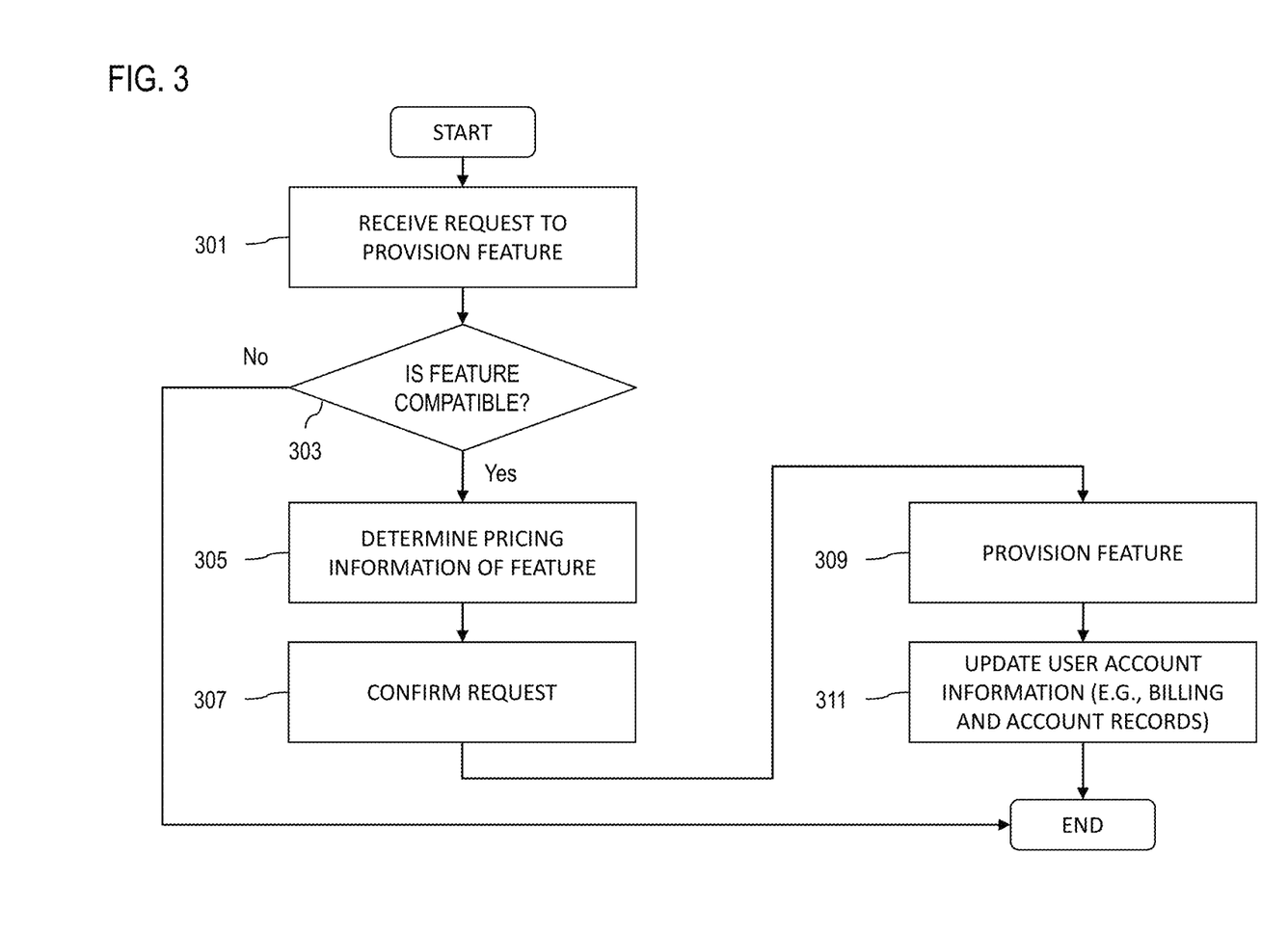
FIG. 3 is a flowchart of a process for provisioning a feature on multiple media devices, according to an exemplary embodiment.

FIG. 3 is a flowchart of a process for provisioning a feature on multiple media devices, according to an exemplary embodiment. In step 301, the feature provisioning platform 111 receives a request to provision a feature that is to be invoked on multiple devices (e.g., STBs 113a, 113b). This input may, for example, include the name of the feature, date to enable the feature, and devices on which to activate the feature. In exemplary embodiments, the user may specify the input by any number of input methods including via one of the user's devices, via a web interface on a third device, via a telephonic device, etc.

After receiving the input, the feature provisioning platform 111 determines whether the requested feature is compatible with the user's devices (step 303). More specifically, the platform 111 can query the user accounting platform 121 to determine whether the user's devices meet the minimum requirements set for a particular feature. As discussed above, the MR-DVR may, for example, require at least one hub device and one or more client devices. If the feature provisioning platform 111 determines that the user's devices are not compatible with the requested feature, the platform 111 will alert the user.

If the user's devices are compatible with the requested feature, the feature provisioning platform 111 may then, for instance, determine pricing information associated with the requested feature based on a variety of factors (e.g., account information, marketing campaigns, and regional information), as discussed previously with respect to FIG. 2 (step 305). After determining the pricing information (e.g., price), the feature provisioning platform 111 may display the price to the user and request that the user confirm the request for the feature (step 307).

Upon confirmation, the feature provisioning platform 111 provisions the feature on the user's devices by authenticating and activating the feature on the devices (step 309). It is contemplated that any type of authentication process (e.g., user name and password, key access number, unique machine identifier (e.g., MAC address), biometric identifier) can be employed to ensure that the feature is provisioned only on authorized devices. As previously described, the provisioning process may include sending a command to the devices 113, which then update their respective flags corresponding to the requested feature. For example, if a feature flag is "on" in a particular device, that device will be able to access the feature. To complete the provisioning process, the feature provisioning platform 111 updates the user account information (e.g., billing and user account records) in, for example, the user accounting system 121 to reflect the addition of the feature to the user's account (step 311).

In exemplary embodiments, the process of FIG. 3 occurs through automated processes without manual intervention to enable efficient, rapid self-provisioning and delivery of new features to the user's devices.

Figure 4:
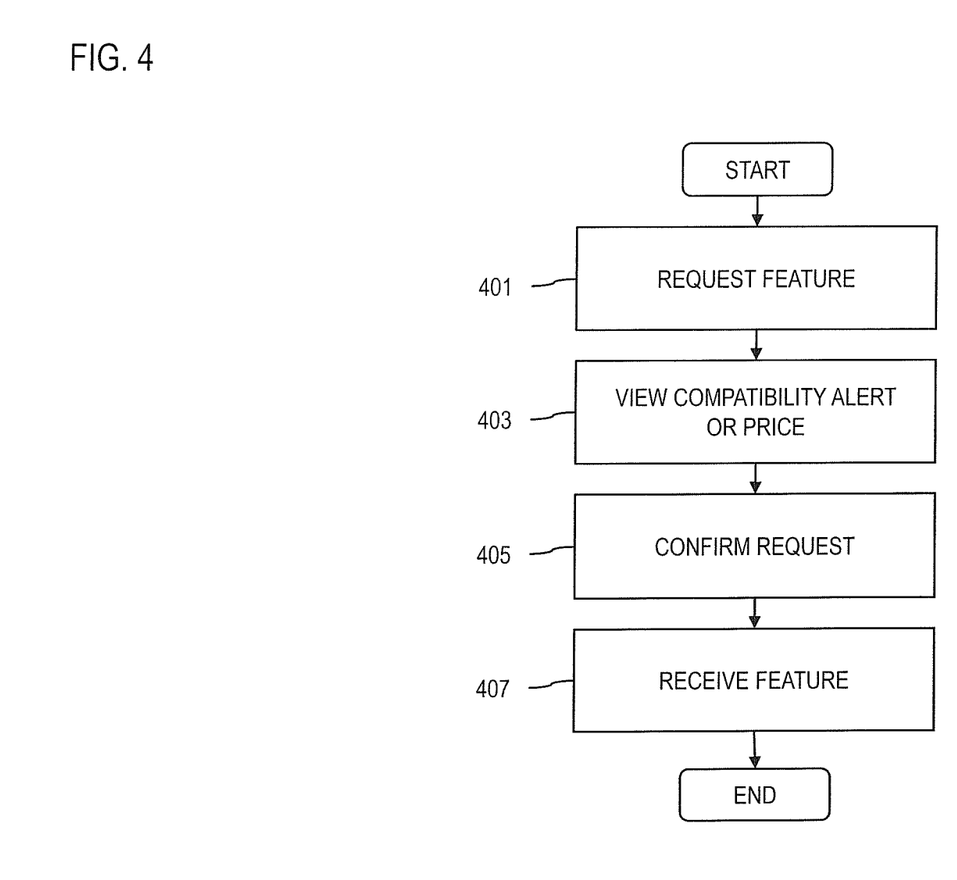
FIG. 4 is a flowchart of a process for requesting the provisioning of a feature on multiple media devices, according to an exemplary embodiment.
Figure 5A:
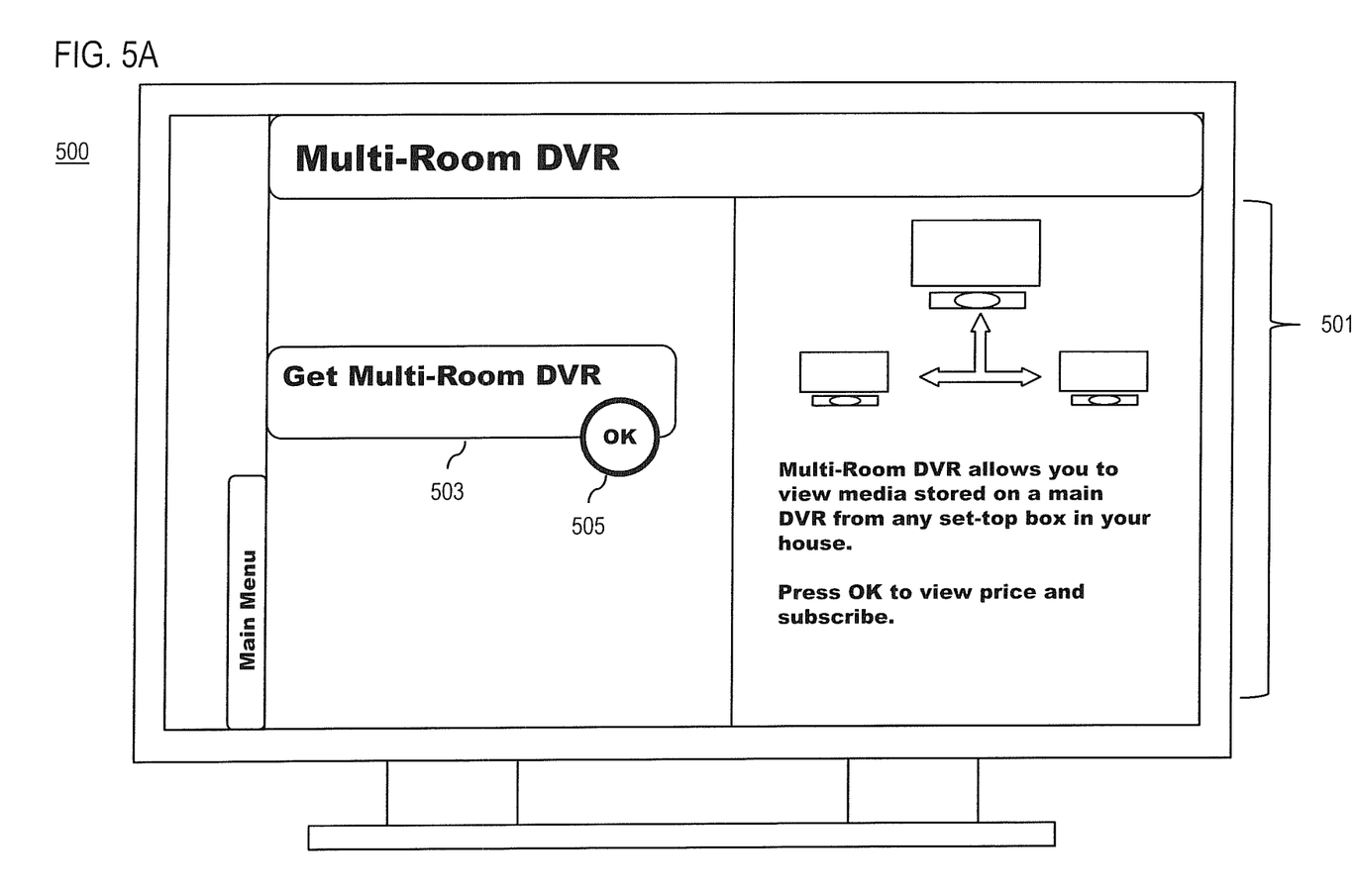
FIGS. 5A-5E are diagrams of a user interface utilized in the process of FIG. 4, according to an exemplary embodiment.

FIG. 4 is a flowchart of a process for requesting the provisioning of a feature on multiple media devices, according to an exemplary embodiment. This process is described with respect to an exemplary user interface of FIGS. 5A-5E. Such interface may be implemented using, for example, set-top box 113, end terminal 115, or host 123. In step 401, the user requests a feature for provisioning on the user's media devices. For example, the user may make a request for a feature using the process described with respect to FIG. 3. FIG. 5A depicts a user interface screen 500 wherein the feature provisioning platform 111 displays a description of a feature 501 and a menu selection 503 for requesting the feature. In this example, the feature description 501 describes a MR-DVR service as follows: "Multi-Room DVR allows you to view media stored on a main DVR from any set-top box in your house." The user interface screen 500 also provides a menu selection button 505 designated by "OK" to initiate a request for provisioning the feature. The user may select the button 505 and initiate the request by using, for instance, a STB remote control or similar control device to actuate the button.

Figure 5B:
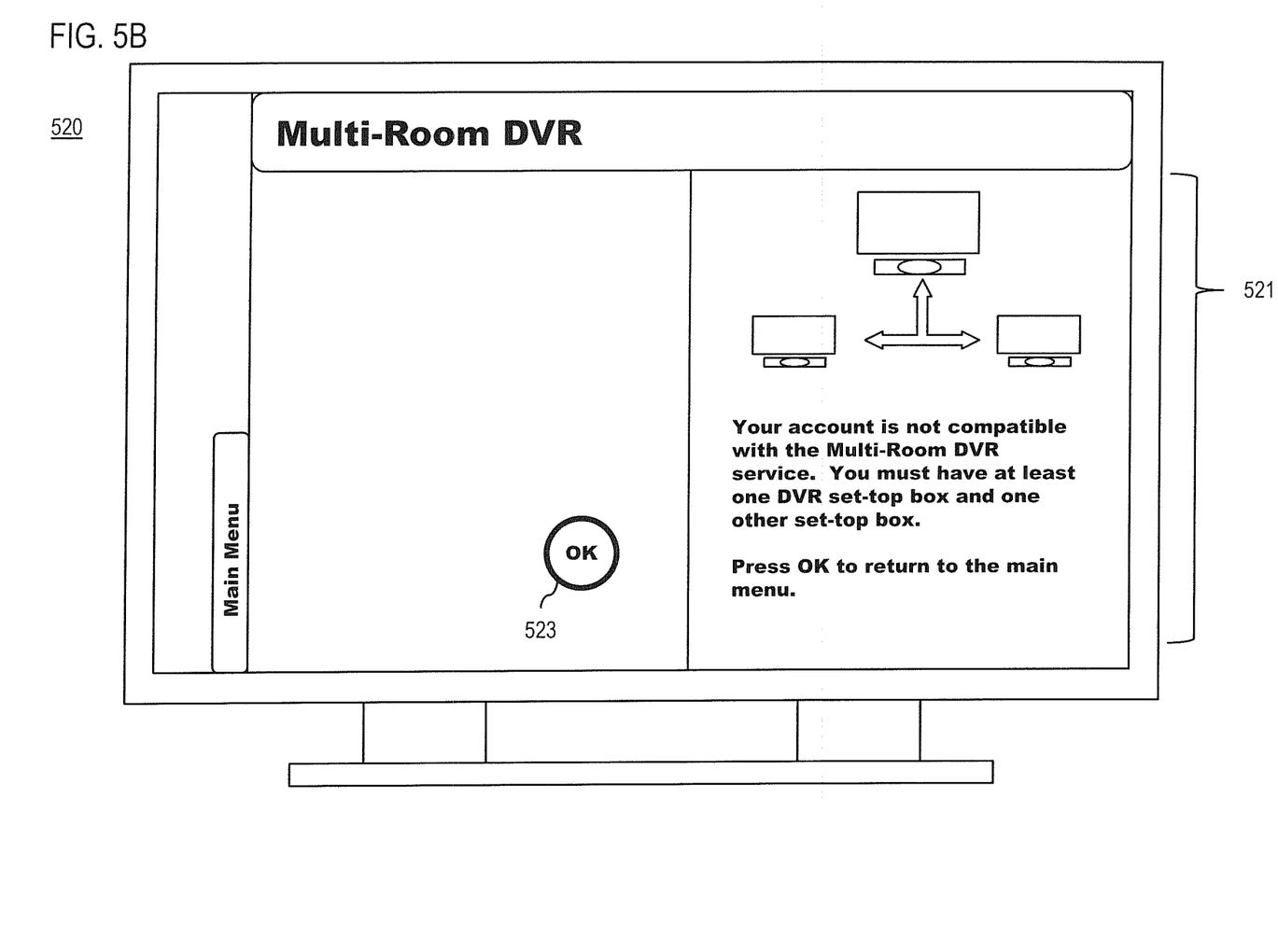

In response to the user's request, the feature provisioning platform 111 makes a compatibility determination and computes a price for the feature according to the process described with respect to FIG. 3. In step 403, the user either views a compatibility alert or the price of the feature depending on the results of the compatibility determination. If the user's devices are not compatible with the feature, the feature provisioning platform 111 alerts the user. FIG. 5B depicts a user interface screen 520 alerting the user of an incompatibility between the user's devices and the requested MR-DVR feature. For example, user interface screen 520 displays a message 521 that "Your account is not compatible with the Multi-Room DVR service. You must have at least one DVR set-top box and one other set-top box." The user can then press an "OK" (i.e., confirmation) button 523 to return to the main menu.

Figure 5C:
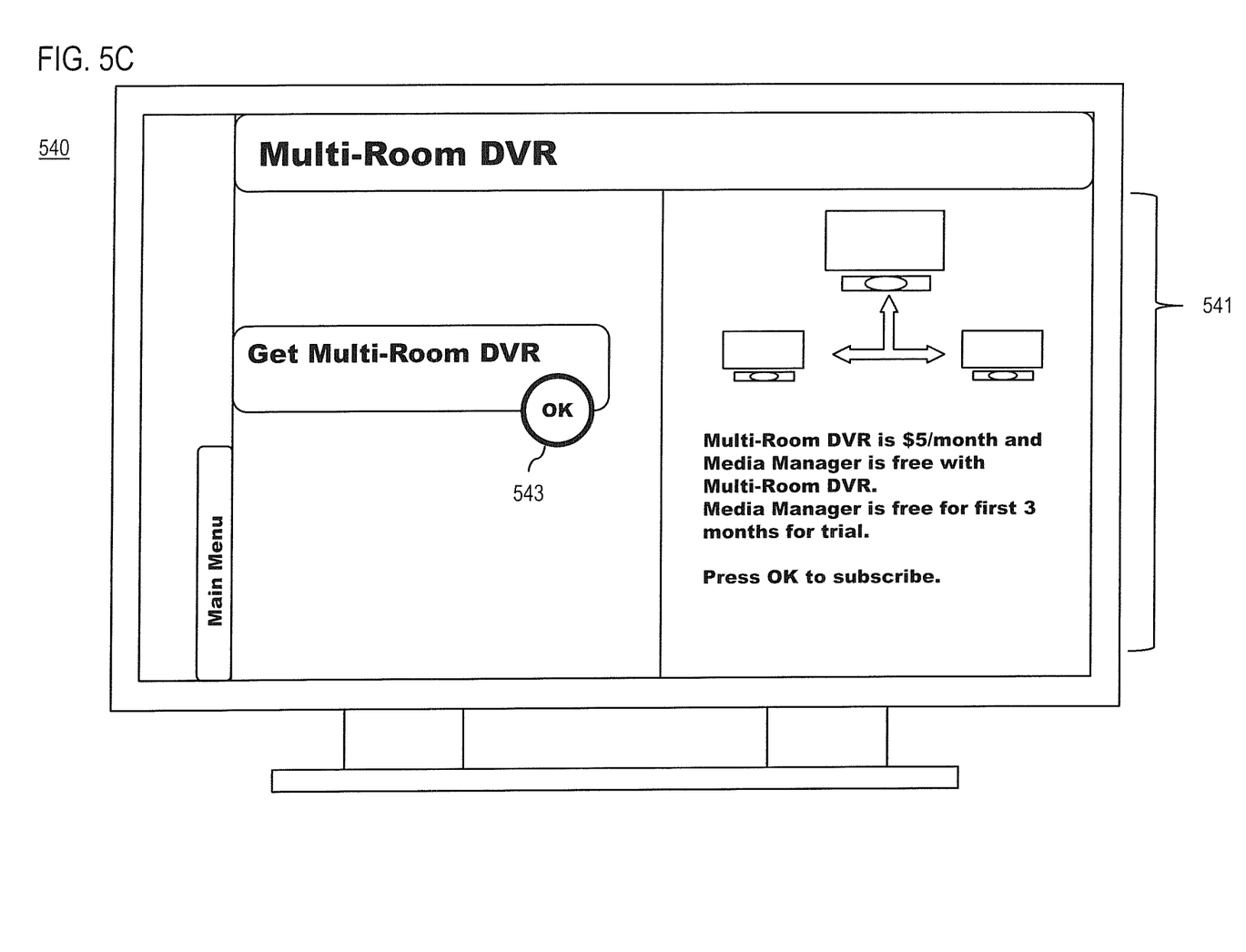

If the user's devices are compatible with the feature, the feature provisioning platform 111 displays the calculated price for the feature and asks the user to confirm the feature request. FIG. 5C depicts a user interface screen 540 displaying the calculated price of the MR-DVR feature. In this example, the platform 111 displays a message 541 that the price for the feature is "$5/month and Media Manager is free with the Multi-Room DVR." Further, the media manager can be offered as a free trial for the first 3 months." The 3-months free offer, for instance, is a marketing promotion specific to the area where the user's devices are located. The user may select the OK button 543 to signal the user's intent to subscribe to the feature and proceed to the next step.

Figure 5D:
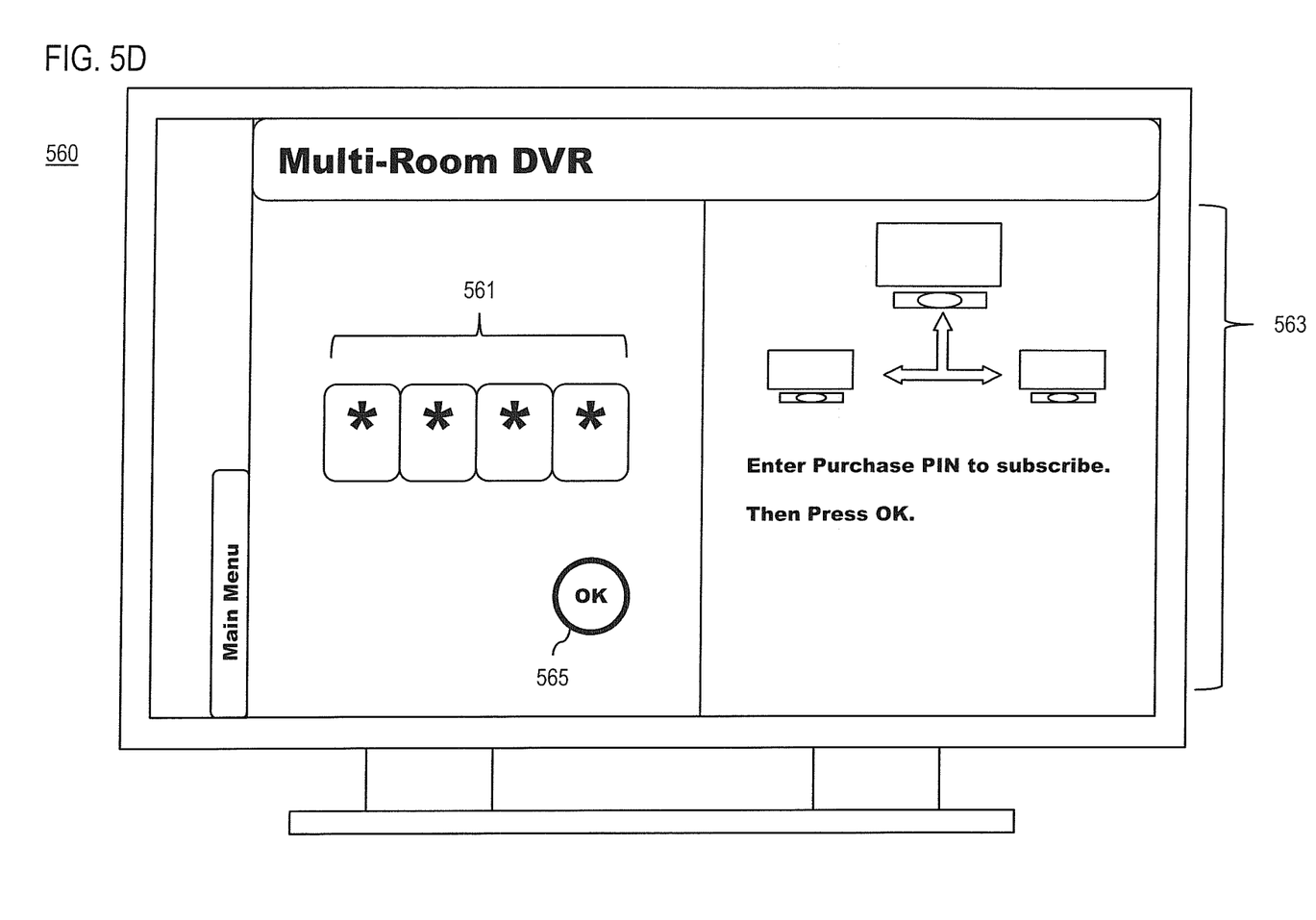

In exemplary embodiments, the process, per step 405, next asks the user to confirm the request for subscription to the selected feature. In other embodiments, the feature provisioning platform 111 may bypass the confirmation step. The confirmation step may include a request to authenticate that the user is authorized to make the request. Again, it is contemplated that any type of authentication process (e.g., user name and password, personal identification number, key access number, unique machine identifier (e.g., MAC address), biometric identifier) can be employed to ensure that only authorized users can request new features. FIG. 5D depicts a user interface screen 560 requesting that the user enter a previously generated personal identification number (PIN) 561 to confirm subscription to the MR-DVR service. User interface screen 560 displays a message 563 directing the user to "Enter Purchase PIN to subscribe." The user can enter a PIN 561 and select OK button 565 to confirm subscription to the feature.

Figure 5E:
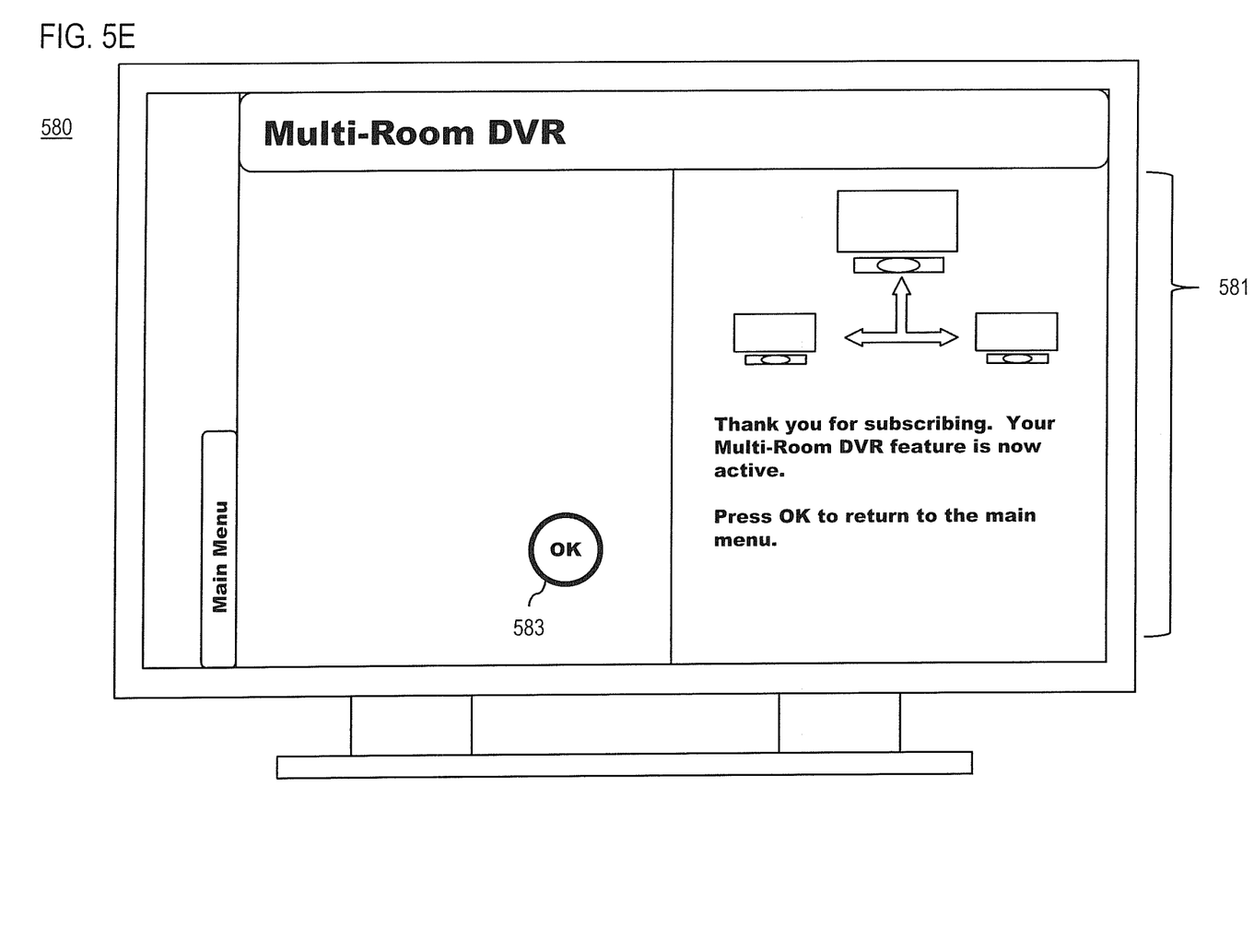

On authentication of the user's request (e.g., verification of the PIN), the user receives access to the feature on the user's devices (step 407). FIG. 5E depicts a user interface screen 580 displaying a confirmation message 581 the self-provisioning process for the MR-DVR feature has been successful. The user may select "OK" button 583 to proceed to the main menu and begin using the DVR service.

The processes described herein for provisioning a feature on multiple media devices may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 6:
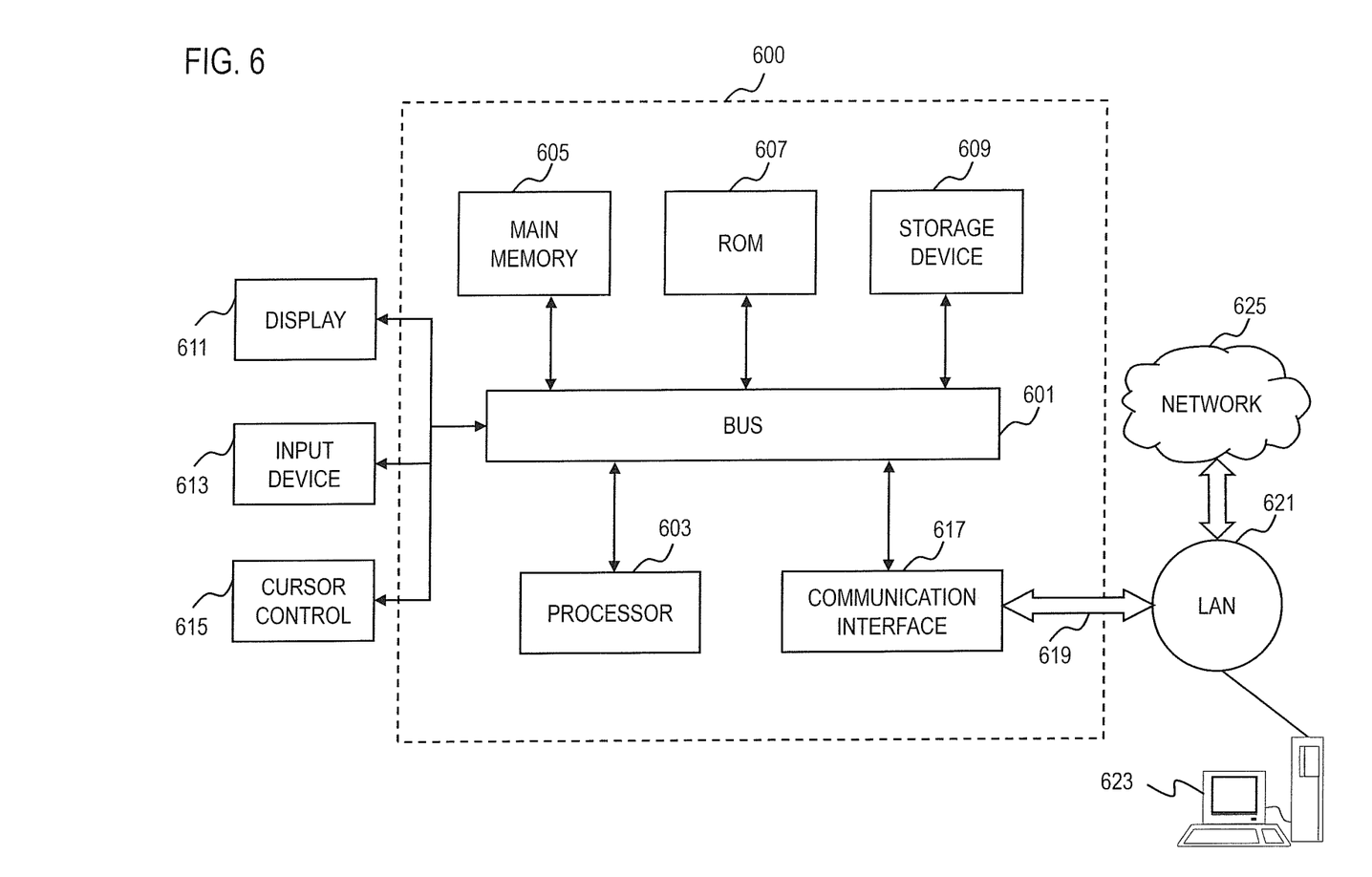
FIG. 6 is a diagram of a computer system that can be used to implement various exemplary embodiments.

FIG. 6 illustrates computing hardware (e.g., computer system) upon which an embodiment according to the invention can be implemented. The computer system 600 includes a bus 601 or other communication mechanism for communicating information and a processor 603 coupled to the bus 601 for processing information. The computer system 600 also includes main memory 605, such as random access memory (RAM) or other dynamic storage device, coupled to the bus 601 for storing information and instructions to be executed by the processor 603. Main memory 605 also can be used for storing temporary variables or other intermediate information during execution of instructions by the processor 603. The computer system 600 may further include a read only memory (ROM) 607 or other static storage device coupled to the bus 601 for storing static information and instructions for the processor 603. A storage device 609, such as a magnetic disk or optical disk, is coupled to the bus 601 for persistently storing information and instructions.

The computer system 600 may be coupled via the bus 601 to a display 611, such as a cathode ray tube (CRT), liquid crystal display, active matrix display, or plasma display, for displaying information to a computer user. An input device 613, such as a keyboard including alphanumeric and other keys, is coupled to the bus 601 for communicating information and command selections to the processor 603. Another type of user input device is a cursor control 615, such as a mouse, a trackball, or cursor direction keys, for communicating direction information and command selections to the processor 603 and for controlling cursor movement on the display 611.

According to an embodiment of the invention, the processes described herein are performed by the computer system 600, in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multi-processing arrangement may also be employed to execute the instructions contained in main memory 605. In alternative embodiments, hard-wired circuitry may be used in place of or in combination with software instructions to implement the embodiment of the invention. Thus, embodiments of the invention are not limited to any specific combination of hardware circuitry and software.

The computer system 600 also includes a communication interface 617 coupled to bus 601. The communication interface 617 provides a two-way data communication coupling to a network link 619 connected to a local network 621. For example, the communication interface 617 may be a digital subscriber line (DSL) card or modem, an integrated services digital network (ISDN) card, a cable modem, a telephone modem, or any other communication interface to provide a data communication connection to a corresponding type of communication line. As another example, communication interface 617 may be a local area network (LAN) card (e.g. for Ethernet™ or an Asynchronous Transfer Model (ATM) network) to provide a data communication connection to a compatible LAN. Wireless links can also be implemented. In any such implementation, communication interface 617 sends and receives electrical, electromagnetic, or optical signals that carry digital data streams representing various types of information. Further, the communication interface 617 can include peripheral interface devices, such as a Universal Serial Bus (USB) interface, a PCMCIA (Personal Computer Memory Card International Association) interface, etc. Although a single communication interface 617 is depicted in FIG. 6, multiple communication interfaces can also be employed.

The network link 619 typically provides data communication through one or more networks to other data devices. For example, the network link 619 may provide a connection through local network 621 to a host computer 623, which has connectivity to a network 625 (e.g. a wide area network (WAN) or the global packet data communication network now commonly referred to as the "Internet") or to data equipment operated by a service provider. The local network 621 and the network 625 both use electrical, electromagnetic, or optical signals to convey information and instructions. The signals through the various networks and the signals on the network link 619 and through the communication interface 617, which communicate digital data with the computer system 600, are exemplary forms of carrier waves bearing the information and instructions.

The computer system 600 can send messages and receive data, including program code, through the network(s), the network link 619, and the communication interface 617. In the Internet example, a server (not shown) might transmit requested code belonging to an application program for implementing an embodiment of the invention through the network 625, the local network 621 and the communication interface 617. The processor 603 may execute the transmitted code while being received and/or store the code in the storage device 609, or other non-volatile storage for later execution. In this manner, the computer system 600 may obtain application code in the form of a carrier wave.

The term "computer-readable medium" as used herein refers to any medium that participates in providing instructions to the processor 603 for execution. Such a medium may take many forms, including but not limited to non-volatile media, volatile media, and transmission media. Non-volatile media include, for example, optical or magnetic disks, such as the storage device 609. Volatile media include dynamic memory, such as main memory 605. Transmission media include coaxial cables, copper wire and fiber optics, including the wires that comprise the bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
    receiving, by a processor, a request to provision a feature on a plurality of set-top boxes, wherein the feature is a multi-room digital video recorder (MR-DVR) feature;
    determining, by the processor, whether the feature is compatible with each of the set-top boxes based on whether first and second set-top boxes of the set-top boxes are respectively compatible with first and second requirements of the feature, wherein the determination comprises:
        determining whether the first set-top box is capable of accessing content stored by the second set-top box; and
        determining whether the second set-top box is capable of sharing access content stored by the second set-top box with the first set-top box; and
    provisioning the feature, by the processor, based on the request and the determination.

2. A method of claim 1, further comprising:
    authenticating the set-top boxes; and
    sending a command to the set-top boxes to activate the feature.

3. A method of claim 1, further comprising:
    determining a price for the feature; and
    updating user account information associated with the set-top boxes.

4. A method of claim 1, wherein the first requirement requires the first set-top box to be provisioned as a client device and the second requirement requires the second set-top box to be provisioned as a hub device.

5. A method of claim 1, wherein the request is transmitted from a browser over a data network.

6. A method of claim 1, further comprising:
provisioning one or more of the set-top boxes as part of the request without any manual intervention when the feature is determined to be compatible with the set-top boxes.

7. An apparatus comprising:
an ordering module configured to receive a request to provision a feature on a plurality of set-top boxes, wherein the feature is a multi-room digital video recorder (MR-DVR) feature;
a compatibility module configured to determine whether the feature is compatible with each of the set-top boxes based on whether first and second set-top boxes of the set-top boxes are respectively compatible with first and second requirements of the feature, wherein the determination comprises:
  determining whether the first set-top box is capable of accessing content stored by the second set-top box; and
  determining whether the second set-top box is capable of sharing access content stored by the second set-top box with the first set-top box; and
a provisioning module configured to provision the feature based on the request and the determination.

8. An apparatus of claim 7, wherein the provisioning module is further configured to authenticate the set-top boxes and to send a command to the set-top boxes to activate the feature.

9. An apparatus of claim 7, further comprising:
a billing module configured to determine a price for the feature and to update user account information associated with the set-top boxes.

10. An apparatus of claim 7, wherein the first requirement requires the first set-top box to be provisioned as a client device and the second requirement requires the second set-top box to be provisioned as a hub device.

11. An apparatus of claim 7, wherein the request is transmitted from a browser over a data network.

12. An apparatus of claim 7, wherein the provisioning module is further configured to provision one or more of the set-top boxes as part of the request without any manual intervention when the feature is determined to be compatible with the set-top boxes.

13. A method comprising:
initiating, by a processor, a request, on one of a plurality of set-top boxes, by a user to provision a feature for the set-top boxes, wherein the feature is a multi-room digital video recorder (MR-DVR) feature;
determining whether the feature is compatible with the set-top boxes based on whether first and second set-top boxes of the set-top boxes are respectively compatible with first and second requirements of the feature, wherein the determination comprises:
  determining whether the first set-top box is capable of accessing content stored by the second set-top box; and
  determining whether the second set-top box is capable of sharing access content stored by the second set-top box with the first set-top box; and
invoking the feature on the set-top boxes if the feature is determined to be compatible with the set-top boxes.

14. A method of claim 13, further comprising:
presenting pricing information for the feature to the user via a display coupled to the one set-top box.

15. A method of claim 13, wherein the set-top boxes are configured to access media from a common device.

16. A method of claim 13, wherein one or more of the set-top boxes are provisioned as part of the request without any manual intervention when the feature is determined to be compatible with the set-top boxes.

17. A system comprising:
a set-top box configured to initiate a request in response to input by a user to provision a feature for a plurality of set-top boxes including the set-top box, wherein the feature is a multi-room digital video recorder (MR-DVR) feature; and
a media recording device configured to store media,
wherein the feature is invoked on the set-top boxes if the feature is determined to be compatible with each of the set-top boxes and the media recording device, the feature permitting access to the stored media within the device by the set-top boxes, wherein the feature is determined to be compatible based on a determination of whether the set-top boxes are capable of accessing content stored by the media recording device and based on a determination of whether the media recording device is capable of sharing access content stored by the media recording device with the set-top boxes.

18. A system of claim 17, further comprising:
a display coupled to the set-top box and configured to present pricing information for the feature to the user.

19. A system of claim 17, wherein the set-top boxes are non-DVR set-top boxes.

20. A system of claim 17, wherein one or more of the set-top boxes are provisioned as part of the request without any manual intervention when the feature is compatible with each of the set-top boxes.

* * * * *